Feb. 6, 1962     T. S. TEETOR     3,020,443
DEFLECTION CIRCUIT FOR CATHODE RAY TUBE
Filed Nov. 27, 1959
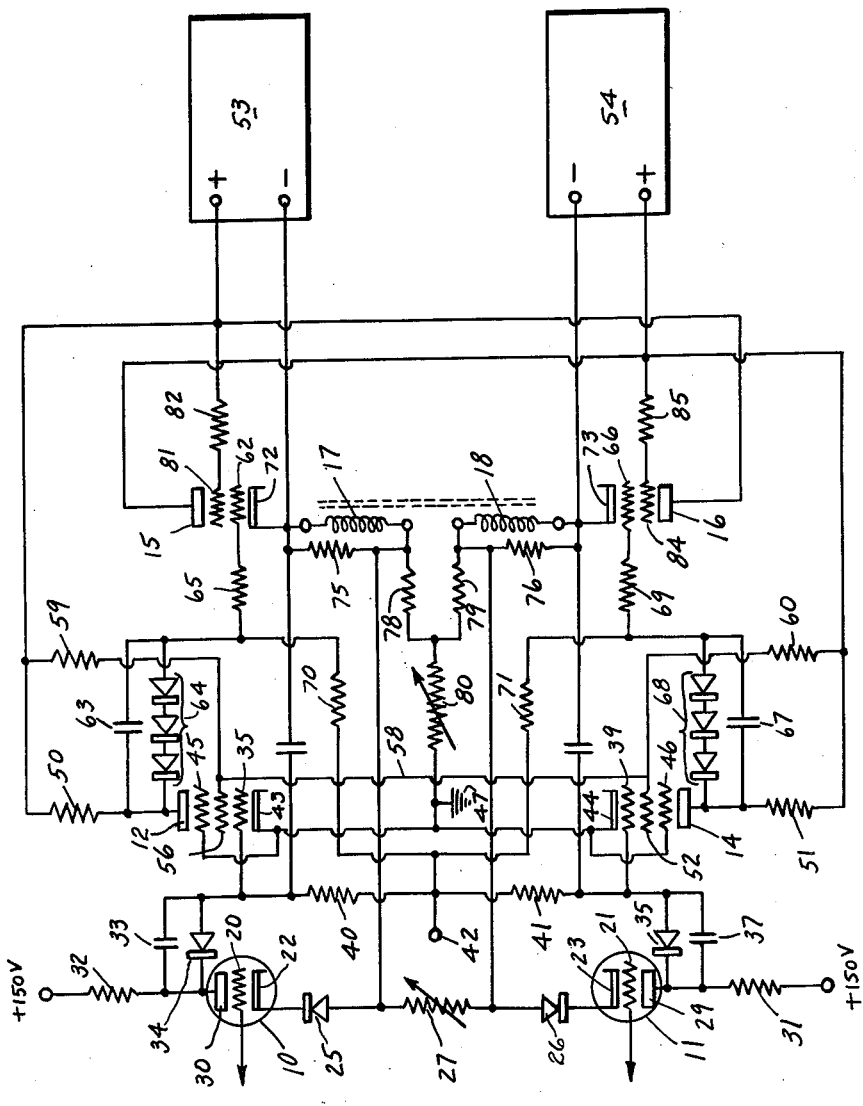
INVENTOR.
THOMAS S. TEETOR.
BY
Lockwood, Galt, Woodard & Smith
ATTORNEYS.

United States Patent Office 3,020,443
Patented Feb. 6, 1962

3,020,443
DEFLECTION CIRCUIT FOR CATHODE RAY TUBE
Thomas S. Teetor, Fort Wayne, Ind., assignor to The Magnavox Company, Fort Wayne, Ind., a corporation
Filed Nov. 27, 1959, Ser. No. 855,765
5 Claims. (Cl. 315—26)

This invention relates generally to deflection circuits for cathode ray tubes and more particularly it relates to amplifiers for use in cathode ray tube deflection circuits particularly adapted for radar systems.

This invention overcomes special problems arising in an airborne indicating device utilizing a cathode ray tube for presenting time-shared information from a number of sources in addition to radar returns. For example, radar ranges from 2 to 200 miles radius are displayed with highly accurate correlation between the radar targets and other coordinate information ranging in frequency from 0 to 6000 cycles per second. The information is displayed by means of a cathode ray tube having a magnetic deflection yoke. It was desired to provide both a 2 mile sweep and direct current off-centering of 2½ radii and, therefore, a deflection circuit consisting of a conventional Class A amplifier and push-pull yoke combination would be inadequate both in respect to size and power. The fast sweep requires either a low impedance deflection yoke with relatively poor current sensitivity and/or relatively high B-plus voltage; however, the average current requirement is low because of the sawtooth wave form and short duty cycle. When off-centering alone is to be applied, it is usually accomplished by either a separate yoke or power supply current to shunt isolation inductors. When the added requirement of ground-stabilized presentation or other unpredictable direct current information is combined with the fast sweep, a direct coupled amplifier is required. An efficient direct current system requires a high impedance yoke for current sensitivity and as little B voltage as possible since the duty cycle is 100%. However, the indicator equipment requires the direct current capability and a linear speed of approximately 1° of deflection per micro second. The alternating current to direct current conformance requires static and dynamic linearity of better than 0.3%.

The principal object of this invention is to provide a high efficiency amplifier for a cathode ray deflection system adaptable for use in the indicator equipment having the capabilities described above.

Another object of this invention is to provide an amplifier for cathode ray deflection systems of the type used in radar systems wherein the information displayed ranges in frequency from 0 to 6000 cycles per second.

Another object of this invention is to provide an amplifier for cathode ray tube deflection systems having improved stability.

The full nature of the invention will be understood from the accompanying drawings and the following description and claims.

The single FIGURE is a schematic diagram of the amplifier circuit as provided in accordance with this invention.

This invention comprises an amplifier circuit having three pairs of amplifier tubes connected in push-pull relation. The first stage of the amplifier circuit consists of tubes 10 and 11 connected in push-pull relation with one another, tubes 12 and 14 connected in push-pull relation with one another and tubes 15 and 16 connected in push-pull relation with one another. The output circuit of tubes 15 and 16 includes the yoke coil halves 17 and 18 of the deflection yoke of a cathode ray tube.

In the input stage 10, 11 the control grids 20 and 21 of tubes 10 and 11 respectively, may be coupled to a push-pull source of input signal (not shown). The cathodes 22 and 23 of tubes 10 and 11 are connected to low voltage zener diodes 25 and 26 respectively, selected to obtain the correct direct current level at cathodes 21 and 22. A variable resistor 27 is connected between the diodes 25 and 26 to serve as a gain control as will be described subsequently. The anodes 29 and 30 may be coupled to a source of anode voltage in conventional manner through load resistors 31 and 32. The output circuit of tube 10 includes a coupling network consisting of a capacitor 33 and a zener diode 34 connected in parallel with one another between the anode 30 of tube 10 and the control grid 35 of intermediate amplifier stage 12. The anode 20 is coupled by a similar network 37 and 38 to the control grid 39 of the other intermediate amplifier tube 14. The zener diodes 34 and 38 are selected for a sharp reverse voltage breakdown point of approximately 85 volts. Their action is similar to that of a battery in that the dynamic impedance may be of the order of 100 ohms while a large direct current voltage appears across their terminals. This condition is maintained by the small current flow from the anodes of tubes 10 and 11 through the resistors 40 and 41 coupled between the coupling networks and the negative terminal of the anode voltage supply source 42.

The intermediate amplifier tubes 12 and 14 are pentodes having their cathodes 43 and 44 and grids 45 and 46 connected to ground at 47. The anodes of tubes 12 and 14 are coupled through load resistors 50 and 51 to power supplies 53 and 54 respectively. The screen grids 56 and 57 of tubes 12 and 14 respectively are tied together by conductor 58 and are supplied power through resistors 59 and 60. By reason of this arrangement the effective shunt impedance of the power source will appear high, and tubes 12 and 14 will deliver maximum gain only for push-pull signals. The gain for in-phase signal components which might cause bias shifts in the output stage is degenerated by the relatively large series resistance 59 and 60. These resistors are matched in value to cancel the high yoke voltages appearing on the floating power supplies in opposite polarity. The screen grids may be supplied from any source of anode voltage, but the connection as illustrated provides an additional stabilizing effect which contributes to minimum recovery time.

The anode circuit of intermediate stage amplifier tube 12 is coupled to the control grid 62 of the power amplifier tube 15 by means of a network consisting of a capacitor 63 and a group 64 of zener diodes. This network is coupled to grid 62 by means of a resistor 65. The anode circuit of intermediate amplifier stage 14 is coupled to the control grid 66 of power amplifier tube 16 through a similar network consisting of the capacitor 67 and a group of zener diodes 68. The network is coupled to grid 66 through a resistor 69. Resistor 70 is connected between resistor 65 and the negative terminal 42 while resistor 71 is connected between resistor 69 and negative terminal 42. The resistors 70 and 71 are grid return resistors which maintain sufficient current flow through the zener diode groups 64 and 68 to the negative supply voltage terminal 42.

The cathodes 72 and 73 of power amplifier tubes tubes 15 and 16 are connected directly to the yoke coil halves 17 and 18. Coil half 17 is shunted by a resistor 75 while coil half 18 is shunted by a resistor 76. The coil halves 17 and 18 and the resistors 75 and 76 are connected in series by feed-back reference resistors 78 and 79 and the system is referenced to ground through a variable resistor 80. The screen grid 81 of tube 15 is connected through a resistor 82 to the positive terminal of voltage source 53, while the screen grid 84 of tube 16 is connected through resistor 85 to the positive terminal of voltage source 54. The resistors 65, 82, 69 and 85 are conventional control and screen grid "stoppers" which serve the purpose of preventing high frequency parasitics from developing in the power amplifier tubes 15 and 16.

Signals are applied to the grids 20 and 21 of tubes 10 and 11 respectively. The signal is amplified and inverted in phase at the anodes 29 and 30. The amplified signal is coupled to the control grids of tubes 12 and 14 by the networks 33, 34 and 37, 38. This method of direct current coupling is superior to conventional methods using resistance dividers, batteries, gas tubes, or coupling tubes in that a flat frequency response is maintained without unusual loading of the preceding amplifier stage and distributed capacity is held to a minimum. In this type of network, the static and dynamic load impedance presented to the driving amplifier are essentially equal.

The signals are again amplified and phase inverted at the anodes of tubes 12 and 14 and coupled to grids 62 and 66 of tubes 15 and 16 respectively by the coupling networks 63, 64 and 67, 68.

The power amplifier tubes 15 and 16 feed the finally amplified signals to the yoke coil halves 17 and 18.

In order to correct current distortions resulting from non-linearity, phase-shift, and transient response factors of the amplifier and deflection yoke there is provided a push-pull negative current feedback loop. This loop samples the deflection yoke current by means of the series resistors 78 and 79 and the voltage drop across these resistors is proportional to series current flowing in the yoke windings. The push-pull feedback voltage appears across variable resistor 27. This adjusts the total series resistance and provides a means of varying the amount of feedback and the gain of the amplifier. Since resistor 27 is connected to cathodes 22 and 23 through diodes 25 and 26, the push-pull feedback voltage is in series with the input signal voltage applied to the grids 20 and 21. The polarity is such that a positive input voltage causes a positive cathode feedback voltage, whereby the feedback is negative. The primary feedback loop provides approximately 40 db of feedback whereby the symmetry of the display is almost entirely independent of the matching of the yoke halves and matching of resistors 78 and 79. This means of deriving error voltage provides several advantages over the conventional type of system. For example, the shunt yoke capacity to ground is independent of the feedback loop and, therefore, the charging current does not flow through the feedback resistors and only the inductive and distributed capacitive currents can generate error voltage. When a steep wave front signal is applied to the amplifier, no voltage will develop across the resistors 78 and 79 as long as the yoke capacity is absorbing the current from the tubes 15 and 16. Therefore, there is no feedback and the amplifier is "wide open." With 40-db of feedback, the voltage at the control grids of tubes 12 and 14 is essentially 100 times that of a normal signal voltage. Thus the amplifier generates its own "spike" and "step" voltages depending on the slope of the signal voltage. This may also be considered phase correction in the case of sine wave signals. A square wave signal will cause "spike overload" of the amplifier, and the resulting rise time of the deflection current to the desired value is termed the recovery time of the amplifier. In this amplifier, the method of feedback connection and type of interstage coupling network are such that significant improvement in recovery time may be made only by increasing the B-voltage on the output tubes, increasing the output tube peak current capability, and/or reducing the yoke capacity.

Another major advantage over conventional circuitry lies in the screen grid connections of the output tubes 15 and 16. It can be seen from the figure that the output circuit would normally behave as a push-pull cathode follower if some means were not taken to cancel the resulting screen and control grid feedback. In the FIGURE, the screen grids receive their voltage from the same supply as the opposing tube plate. This can be referred to as either a positive feedback loop, or cancellation of negative feedback, depending on the particular brand of semantics in use. In any event, the screen/cathode/B-supply loop is completely independent of the deflection yoke and does not have to be compensated by signal predistortion or separate bucking feedback loops.

A third advantage of the main negative feedback connection lies in its voltage proximity to ground through 80. This not only relieves the yoke winding of high D.-C. voltages, but allows flexibility in the feedback connections to preceding stages.

For providing drift compensation, and push-pull static and dynamic balance, there is provided an in-phase negative current feedback loop which utilizes resistor 80 and samples the cathode current of the intermediate stage tubes 12 and 14. These tubes, being high gain pentodes, are the major contributors to direct current drift effecting the bias voltage applied to the output tubes 15 and 16. The screen grids 56 and 57 of tubes 12 and 14 are tied together by conductor 58 thereby to eliminate push-pull degeneration, but voltage is applied to these grids through dropping resistors 59 and 60 respectively to degenerate in-phase drift and signal components. Resistors 59 and 60 are matched to prevent feedback from the push-pull back E.M.F. developed by the yoke providing it is balanced. Unbalanced screen current or yoke voltage is partially corrected by this connection and results in optimum recovery time of the amplifier in response to a transient. The cathodes 43 and 44 are grounded at 47 thereby to provide continuity for the control grid input signal from tubes 10 and 11. Therefore, for the anode and screen current of tubes 12 and 14 to return to the floating power supplies 53 and 54, the total current from both tubes must flow through resistor 80, 78 and 79 and the yoke windings. The developed voltage across resistor 80 is applied to the cathodes of tubes 10 and 11 across resistor 27. This negative loop not only minimizes the effect of tube drift but desensitizes the amplifier for undesirable in-phase components of the input signal.

For cancelling screen grid degeneration resulting from the cathode load which comprises the yoke coils there is provided a loop which consists of the anode voltage supplies of tubes 12 and 14 and the connection thereof to the screen grids 81 and 82 of tubes 15 and 16. The negative terminals of anode voltage supplies 53 and 54 are connected to the cathodes 72 and 73 of power tubes 15 and 16. This provides a low impedance path for preventing screen degeneration of the power tubes 15 and 16.

For cancelling the control grid degeneration caused by the cathode load on tubes 15 and 16, the anode supply voltages for the tubes 12 and 14 are taken from power supplies 53 and 54. In this manner the cathode voltage on tubes 15 and 16, which is one-half of the back E.M.F. of the yoke coils, is fed around the tubes 15 and 16 to the control grids thereof by means of the low impedance of the power supplies. The high anode resistance of the pentodes 12 and 14 prevents attenuation of this series signal due to the anode load resistors 50 and 51.

The invention claimed is:

1. A deflection circuit for cathode ray tubes comprising a deflection coil, means for energizing said coil comprising a push-pull amplifier having a first amplifier tube and first independent anode voltage supply connected in series across said coil, the cathode of said tube being connected to one end of said coil and a second amplifier tube and second independent anode voltage supply connected in series across said coil in bucking relation to said first anode voltage supply, the cathode of said second tube being connected to the other end of said coil, and an input circuit coupled to the control electrodes of said tubes whereby signal voltages in said input circuit cause current flow in said coil in proportion to said signal voltages.

2. A deflection circuit for cathode ray tubes comprising a deflection coil, means for energizing said coil comprising a push-pull amplifier having a first amplifier tube, the cathode of said tube being connected to one end of said coil, and a second amplifier tube, the cathode of said second tube being connected to the other end of said coil, independent anode voltage sources coupled to said tubes in bucking relation to one another, and an input circuit coupled to the control electrodes of said tubes.

3. A deflection circuit for cathode ray tubes comprising a deflection coil, means for energizing said coil comprising a push-pull amplifier having a first amplifier tube coupled to said coil and a second amplifier tube coupled to said coil, separate independent anode voltage sources coupled to said tubes in bucking relation to one another, and an input circuit coupled to the control electrodes of said tubes.

4. A deflection circuit for cathode ray tubes comprising a pair of deflection coils referenced to ground through a resistor coupled between said coils and ground, means for energizing said coils comprising a push-pull amplifier having a first amplifier tube and first ungrounded anode voltage supply connected in series across said coils, the cathode of said tube being connected to one end of one of said coils and a second amplifier tube and second ungrounded anode voltage supply connected in series across said coils, the cathode of said second tube being connected to the one end of the other of said coils, and an input circuit coupled to the control electrodes of said tubes.

5. A deflection circuit for cathode ray tubes comprising a pair of deflection coils referenced to ground through a resistor coupled between said coils and ground, means for energizing said coils comprising an amplifier having a first amplifier tube and first ungrounded anode voltage supply connected in series across said coils, and a second amplifier tube and second ungrounded anode voltage supply connected in series across said coils in bucking relation to said first anode voltage supply, the cathode of said second tube being connected to the other end of said coil, and an input circuit coupled to the control electrodes of said tubes.

References Cited in the file of this patent
UNITED STATES PATENTS

| | | |
|---|---|---|
| 2,631,260 | Maron | Mar. 10, 1953 |
| 2,728,028 | Carpenter | Dec. 20, 1955 |